US008007657B2

(12) United States Patent
Mentink et al.

(10) Patent No.: US 8,007,657 B2
(45) Date of Patent: Aug. 30, 2011

(54) PREPARATION AND TREATING OF BITUMINOUS COMPOSITIONS

(75) Inventors: Léon Mentink, Roubaix (FR); Joël Bernaerts, Labeuvriere (FR); Michel Maze, Bordeaux (FR); Frédéric Delfosse, Pessac (FR)

(73) Assignee: Roquette Freres, Lestrem (FR)

( * ) Notice: Subject to any disclaimer, the term of this patent is extended or adjusted under 35 U.S.C. 154(b) by 193 days.

(21) Appl. No.: 11/792,847

(22) PCT Filed: Dec. 20, 2005

(86) PCT No.: PCT/FR2005/003207
§ 371 (c)(1),
(2), (4) Date: Jun. 12, 2007

(87) PCT Pub. No.: WO2006/070104
PCT Pub. Date: Jul. 6, 2006

(65) Prior Publication Data
US 2008/0146477 A1    Jun. 19, 2008

(30) Foreign Application Priority Data
Dec. 22, 2004  (FR) ..................................... 04 13750

(51) Int. Cl.
*C09D 195/00* (2006.01)
*C08L 95/00* (2006.01)
(52) U.S. Cl. .................... 208/22; 106/14.35; 106/217.8; 106/273.1; 208/23; 208/39; 524/59
(58) Field of Classification Search ................... 106/278, 106/284.1, 269, 729; 524/109; 510/365, 510/175
See application file for complete search history.

(56) References Cited

U.S. PATENT DOCUMENTS

| | | | | |
|---|---|---|---|---|
| 3,035,930 A * | 5/1962 | Talley | ........................ | 106/284.1 |
| 3,594,202 A * | 7/1971 | Corbett et al. | ................. | 106/278 |
| 5,011,620 A * | 4/1991 | Dishart et al. | ................. | 510/175 |
| 6,156,113 A * | 12/2000 | Pasquier | ........................ | 106/269 |
| 6,165,962 A * | 12/2000 | Kaler et al. | .................... | 510/365 |
| 6,395,810 B1 * | 5/2002 | Luitjes et al. | ................. | 524/109 |
| 2003/0106465 A1 * | 6/2003 | Mentink et al. | ................ | 106/729 |
| 2003/0114635 A1 | 6/2003 | Van Es et al. | | |
| 2004/0260057 A1 | 12/2004 | Michel | | |

FOREIGN PATENT DOCUMENTS

| | | |
|---|---|---|
| EP | 1 466 878 A1 | 10/2004 |
| FR | 2 721 043 | 12/1995 |
| FR | 2 785 603 | 5/2000 |
| GB | 790472 | 2/1958 |
| WO | 99/45060 | 9/1999 |

OTHER PUBLICATIONS

"Asphalt and Bitumen," Ullmann's Encyclopedia of Industrial Chemistry, 6th Edition, vol. 4, pp. 97-117 (2003).
"Asphalt," Encyclopedia of Chemical Technology, 4th Edition, vol. 3, pp. 689-724 (1992).
"Bituminous Products," Encyclopedia of Chemical Technology, 4th Edition, vol. 4, pp. 612-618 (1992).
"Resins, Natural," Ullmann's Encyclopedia of Industrial Chemistry, 6th Edition, vol. 31, pp. 337-355 (2003).
"Resins, Natural," Encyclopedia of Chem. Tech., 4th Ed., vol. 21, pp. 291-302 (1992).

* cited by examiner

*Primary Examiner* — Ellen McAvoy
*Assistant Examiner* — Chantel Graham
(74) *Attorney, Agent, or Firm* — Young & Thompson

(57) ABSTRACT

Described is the use, for preparing or treating bituminous compositions, of at least one compound selected among: esters of glycolic, lactic and gluconic acids, methylic, ethylic and isobutylic esters of glutaric, succinic and adipic acids, and ethers or esters of a product resulting from internal dehydration of a sugar, preferably a hydrogenated sugar. Also described is a method for preparing or treating such compositions and the resulting compositions.

19 Claims, No Drawings

PREPARATION AND TREATING OF BITUMINOUS COMPOSITIONS

CROSS REFERENCE TO RELATED APPLICATIONS

This application is the 35 U.S.C. 371 national stage of International application PCT/FR2005/003207 filed on Dec. 20, 2005; which claimed priority to France application 04/13750 filed on Dec. 22, 2004. The entire contents of each of the above-referenced applications are hereby incorporated by reference.

The present invention relates to the use of particular organic compounds for preparing or treating bituminous compositions. The invention also relates to the bituminous compositions thus prepared or treated using these particular organic compounds.

The term "bituminous compositions" means in particular:
a) crude petroleum and bitumens, asphalts and fuel oils derived from petroleum, and also bituminous binders based on such products,
b) bitumens and asphalts of natural origin, and also bituminous binders based on such products,
c) any fraction obtained by any separation technique from bitumens, asphalts and fuel oils of any origin,
d) carbon-based chemical products derived from the pyrolysis of charcoal,
e) tars of any origin, in particular derived from coal or wood and any fraction that may be obtained therefrom,
f) Theological analogs of the above-mentioned products, especially of the bitumens and bituminous binders, based on resins of natural origin (natural rosins, pitch, accroid resins, balsam resins, shellac, etc.),
g) rheological analogs of the above-mentioned products, especially of the bitumens and bituminous binders, based on any derivative obtained via any technique, especially a chemical technique, for modifying said natural resins, such as modified rosins and modified terpenic resins,
h) any composition containing at least 25% and preferably at least 50% by weight of at least any one of the abovementioned products a) to g) and also possibly containing, for example, at least one other component chosen from water, mineral, animal and vegetable oils and derivatives of said oils, for instance the methyl esters, synthetic resins, elastomers or (thermo)plastics of natural or synthetic origin such as rubbers, coloring materials and granulates (stones, gravel, broken gravel, sand, etc.).

These compositions are intended firstly for preparing building and civil industry (BCI) materials and in particular road construction materials.

Secondly, these compositions are intended for performing leakproofing operations, not only for BCI but also in the fields of naval, motor vehicle or aeronautical construction, and in agriculture. They may especially be bituminous or asphalt compositions as described or referenced:
in the chapter entitled "Asphalt and Bitumen" on pages 97 to 117, Vol. 4 of the 6th edition of "Ullmann's Encyclopedia of Industrial Chemistry" (2003), Wiley-VCH Verlag GmbH & Co KgaA, Weinheim (Germany), or
in the chapter entitled "Asphalt" on pages 689 to 724, Vol. 3 of the 4th edition of Kirk-Othmer's "Encyclopedia of Chemical Technology" (1992), John Wiley & Sons, Inc. or
in the chapter entitled "Bituminous products" on pages 612 to 618, Vol. 4 of the 4th edition of the abovementioned Kirk-Othmer publication, or
in any of the patents FR 2 721 043, EP 900 822 B1, FR 2 785 603, U.S. Pat. No. 5,605,946, EP 1 466 878, EP 1 482 012 or WO 2005/087869,
in any of the national, European or international standards relating to bitumens and bituminous binders such as the standards FD T 65-000, NF EN 12591 or NF EN 12597.

They may in particular be bitumens or bituminous binders that are in solid, pasty or liquid form, including the form of emulsions, especially aqueous emulsions, especially such as pure bitumens, road bitumens, industrial bitumens, oxidized bitumens, fluxed bitumens, fluidized bitumens, polymer-modified bitumens, bitumens for anionic or cationic emulsions, and anionic or cationic bitumen emulsions.

They may also be formulated compositions such as bituminous road mixes combining at least one bituminous binder with at least one type of granulate, or more elaborate and shaped compositions such as films, plates or sheets for leakproofing, for insulation (for example thermal or sound insulation) and/or for roofing, geomembranes, etc., whose structure contains at least one bituminous layer.

As indicated previously, the bituminous compositions prepared and/or treated in accordance with the invention may also be rheological analogs of the abovementioned products a) to e), in particular bitumens or bituminous binders, said Theological analogs being based on at least one resin of natural origin, optionally subsequently modified, as described:
in the chapter entitled "Resins, Natural" on pages 337 to 355, Vol. 31 of the 6th edition of the abovementioned publication "Ullmann's Encyclopedia", or
in the chapter entitled "Resins, Natural" on pages 291 to 302 of the 4th edition of the abovementioned Kirk-Othmer publication, or
in patents EP 304 767 or EP 1 466 878 A1 and based, for example, on pinene terpenic resin, on phenolic ester of modified rosin or on maleic ester of rosin.

The term "Theological analog" of any of the abovementioned products a) to e), in particular of bitumen or bituminous binder, means any composition prepared or treated in accordance with the invention in which the product in question, in particular the pure bitumen or the bituminous binder, has been totally or partially replaced with a resin of natural origin, optionally modified, this being performed under conditions (especially in terms of selection of the nature and degree of introduction of resin but also of any other component included in the final formulation of said composition) such that said composition has rheological characteristics, especially in terms of penetration, softening point and/or viscosity, which are similar or relatively close to those of the product, in particular of the bitumen or bituminous binder, that it is intended to replace.

It may in particular be, as described in the abovementioned patents EP 304 767 or EP 1 466 878, a case of binders of plant origin capable of being replaced with bituminous binders for the purpose of preparing building and civil industry (BCI) materials, including sidewalks.

In this sector and more generally in any field of activity conventionally involving bituminous compositions (BCI, but also naval, motor vehicle or aeronautical construction, agriculture, etc.) or needing to treat such compositions (activities of decontamination or cleaning of structures, inert or otherwise), a means is sought that, ideally, has all of the criteria listed below:
a) it is effective for any function for which it is intended in a given application, for example as a fluxing agent, i.e. as an agent capable of lowering the viscosity at elevated temperature (80-200° C.) of bituminous compositions while at the same time ensuring that they have, after cooling sufficiently rapidly to room temperature, the required mechanical characteristics and especially a sufficient rise in cohesion, b) it does not deteriorate, or may even improve, the conditions of preparation and/or the conditions of use of any composition into which it is incorporated, c) it does not deteriorate, or may even improve, the performance and intermediate and final physical characteristics of said composition or of any material containing it, d) it is harmless and causes minimum disruption, especially with regard to the ever-more restrictive regulations in terms of human and environmental protection, e) it is derived from materials of natural origin that are, if possible, renewable, so as to engage in an approach of durable development.

In the particular field of bituminous compositions intended for the building and civil industry (BCI) sector, for example the road industry (road (re)construction, maintenance and repair), a means is most particularly sought that, ideally, and with regard to the abovementioned criteria:

a) can advantageously be used as a functional adjuvant, especially as a fluxing agent, b) can advantageously be used both in binder compositions intended to be applied at elevated temperature, i.e. between about 80 and 200° C. (i.e. hot-mixed with granulates and/or hot-spread onto the support before applying the granulates) and generally anhydrous, and in binder compositions intended to be applied without heating, i.e. at a temperature generally below 100° C. (i.e. cold-mixed with granulates and/or cold-spread onto a support before applying the granulates), generally being in the form of aqueous emulsions, c) allows the resulting products, for example hot road mixes, cold road mixes and coverings obtained from said binder compositions, to acquire and conserve mechanical and Theological characteristics that make them suitable for the use for which they are intended, especially for their road use, d) is ecologically more acceptable than adjuvants, for example fluxing agents, of fossil origin (petroleum or coal) and especially:

does not contain any hazardous substances and especially any substances recognized as being carcinogenic or mutagenic, such as aromatic hydrocarbons, in particular benzene and its derivatives, naphthalene or chrysene, has a lower propensity to generate vapors, including during the hot application of binder compositions, has a sufficiently high flash point, preferably higher than that of adjuvants of fossil origin, which is generally less than 100° C. and usually between 50 and 90° C., has an acceptable odor, i.e. an odor that is significantly less disagreeable or irritant than that of adjuvants of fossil origin, and is preferably odorless, has good rinseability, i.e. a good capacity to be entrained by an aqueous solution while at the same time remaining environmentally harmless (absence of bioaccumulation).

It has been proposed to this effect, in the particular field of bitumen emulsions, to use rapeseed oil or a rapeseed oil derivative, optionally in combination with other vegetable oils (especially linseed oil), as a bitumen fluxing agent, as described in the abovementioned patent FR 2 721 043.

It was then recommended, in the particular field of bituminous binders for road construction, to use fluxing or fluidizing agents consisting of methyl monoesters of sunflower oil, optionally isomerized, or of linseed oil, as described in the above-mentioned patent EP 900 822 B1. These methyl monoesters should, in theory, become chemically transformed, and especially crosslink or polymerize, on contact with air after spreading the binder so as to increase the viscosity of said binder and thus, in theory, to ensure a sufficient rise in cohesion over time.

In practice, this polymerization, which is also known as siccativation, is generally insufficient and it is highly recommended to introduce metal catalysts (or siccatives) such as organic salts of cobalt, manganese or zirconium. Besides the fact that it complicates the processes and increases their cost, without sufficient efficacy, especially in terms of rise in cohesion, this introduction is unsatisfactory from an environmental and health viewpoint.

Such monoesters obtained from animal or vegetable oils have moreover been used in bitumens initially used in powder form, for the purpose of preparing, without heating, road mixes that can be spread, also without heating, as described in the abovementioned patent FR 2 785 603.

The introduction of siccativation catalysts is also emphasized in said document.

Finally, more recently, it has been proposed in patent EP 1 466 878 A1, to replace bituminous binders with "rheological analogs", i.e. binders of plant origin, for the preparation of road or civil engineering construction layers.

The claimed binders, selected for their penetration characteristics, are free of any natural and synthetic elastomer or of any thermoplastic polymer and contain from 2% to 98% by weight of at least one natural or modified natural resin, of plant origin and with a selected softening point. They may especially be modified rosins or resins of terpenic pinene type.

The resin-based compositions thus obtained moreover contain from 98% to 2% by weight of an oil of plant origin also having a selected viscosity. This oil may especially be linseed oil, soybean oil, wood oil or dehydrated castor oil, or methyl esters of rapeseed oil.

However, to the Applicant's knowledge, the only effective means used to date on an industrial and commercial scale with a view to replacing adjuvants and especially fluxing agents of fossil origin, during the preparation of bituminous compositions, consists in using methyl monoesters of vegetable oils, in particular of sunflower oil or rapeseed oil.

However, as pointed out previously, these methyl esters of vegetable oils, optionally combined with siccatives, do not satisfy all the technical, economic and environmental objectives required today.

The Applicant has, to its credit, found that certain other organic compounds also derived in general from materials of natural and renewable origin can:

not only replace these adjuvants of fossil origin, but also, with regard especially to the abovementioned criteria a) to d), prove to be at least as advantageous as, or even more advantageous in certain respects than, the methyl monoesters of vegetable oils recommended in the prior art.

This merit is all the more worthy since it has been found that these same selected organic compounds can also advantageously be used as a means for treating, especially for cleaning, these same bituminous compositions, in particular as a means for removing residues, marks or stains of such compositions that are on the surface and/or in the constituent bulk of materials and objects of any nature.

More specifically, a subject of the present invention is the use, for preparing or treating bituminous compositions as defined above, of at least one compound chosen from the group consisting of:

glycolic, lactic and gluconic acid esters, and the methyl, ethyl and isobutyl esters of glutaric, succinic and adipic acids, and ethers or esters of a product derived from the internal dehydration of a sugar, preferably of a hydrogenated sugar.

As regards the set of abovementioned esters, they may be monoesters and/or diesters depending especially on the number of COOH functions in the acid under consideration, which are potentially esterifiable, but also on the effective level of esterification (total or otherwise) of each of said functions.

According to a first variant of the invention, the glycolic, lactic or gluconic acid esters are esters of each of these acids and of an alcohol containing up to 14 carbon atoms, preferably of an alcohol containing from 1 to 12 carbon atoms. The ester may especially be methyl, ethyl, butyl, isobutyl, hexyl, ethylhexyl, octyl, decyl or dodecyl lactate or any mixtures of at least any two of these products.

According to a second variant, the esters may also be mixtures of at least two products chosen from the methyl, ethyl and isobutyl esters of glutaric, succinic or adipic acid.

According to another variant, the compound used in accordance with the invention for the preparation or treating of a bituminous composition is an ether or ester of a product derived from the internal dehydration of a sugar, said sugar being chosen from glucose, maltose, lactose, galactose, sucrose, mannose, xylose, ribose, fructose, isomaltulose, sorbose and idose, hydrogenated equivalents of the above-mentioned sugars and mixtures of at least two of these products.

Advantageously, said compound is an ether or an ester of a product derived from the internal dehydration of sorbitol, mannitol or iditol and especially an ether or an ester of isosorbide, of sorbitan, of isomannide, of mannitan, of isoidide or of iditan, or a mixture of at least two of these products.

It may in particular be:

a monoether, a diether or a mixture of at least one monoether and of at least one diether of these products, or a monoester, a diester or a mixture of at least one monoester and of at least one diester of these products.

Preferably, said compound consists predominantly, i.e. to at least 50% of its weight (dry/dry), of diether(s) or of diester(s) of isosorbide, of sorbitan, of isomannide and/or of isoidide.

According to another variant, said compound is advantageously chosen from the group comprising ethyl, methyl, acetyl, butyl, isobutyl, hexyl, 2-ethylhexyl, octenyl, lauryl, palmityl, stearyl or oleyl derivatives of isosorbide, of sorbitan, of isomannide and/or of isoidide and mixtures of at least two of these products.

In a particularly advantageous manner, said compound consists to at least 50% and preferably to at least 80%, of its weight (dry/dry), of methyl derivatives of isosorbide, of sorbitan, of isomannide and/or of isoidide.

Said compound may especially consist to at least 50% and preferably to at least 80%, of its weight (dry/dry), of dimethyl isosorbide (DMI). Advantageously, the DMI then has a purity of greater than 80% and preferentially greater than 90%.

The Applicant company has especially found, as will be shown in the examples hereinbelow, that the selected compounds according to the invention and firstly etherified compounds of isosorbide, most particularly DMI, but also selected esterified compounds such as the isosorbide or lactic acid esters mentioned previously, make it possible:

not only advantageously to replace adjuvants, especially fluxing agents, of fossil origin during the preparation of bituminous compositions, but also advantageously to be used as a means for treating, especially for cleaning, these same bituminous compounds.

It has been found in particular that DMI makes it possible, both for the preparation and for the cleaning of bituminous compounds, to satisfy all the abovementioned criteria a) to e) and does so just as advantageously as, or even more advantageously in certain respects than, the methyl monoesters of vegetable oils recommended in the prior art.

The use of dibasic esters in particular asphalt compositions was already described, more than 30 years ago, in patents U.S. Pat. Nos. 3,035,930 and 3,594,202. Certain particular adipic acid esters are cited individually in these documents, within very long lists of compounds, but are not at all selected in the examples. Above all, the esters envisioned in these documents are necessarily nonvolatile long-fatty-chain esters of high molecular weight and are preferably obtained from alcohols containing at least six carbon atoms. This is especially the case for the only adipic acid esters cited individually, but not at all illustrated as examples, in these two patents, namely, respectively:

bis(2-methylheptyl) adipate and bis(3-ethylhexyl) adipate, mentioned in patent U.S. Pat. No. 3,035,930, and diisooctyl adipate and diisodecyl adipate, mentioned in patent U.S. Pat. No. 3,594,202.

The only products whose use is effectively illustrated, incidentally at degrees of incorporation that are always high (overall between 20% and 65%/asphalt), are respectively sebacic or adipic acid esters and more specifically, respectively, bis(2-ethylhexyl) sebacate, on the one hand (U.S. Pat. No. 3,035,930), and diisocetyl and diisodecyl phthalate, on the other hand (patent U.S. Pat. No. 3,594,202).

As pointed out, they are nonvolatile esters of high molecular weight, which in the present instance is largely higher than 350. They are in the form of very oily liquids and are used, according to these two patents, to make but also to keep asphalts highly flexible, and to do so not only at ambient temperature but also at temperatures that may be extremely low (below −40° C. according to U.S. Pat. No. 3,035,930).

It results therefrom that, according to the teaching of these patents, such esters, like for that matter the abovementioned methyl esters of vegetable oils, are not fluxing agents since they do not make it possible to obtain a good rise in cohesion of asphalt after its application, as is desired in order to replace petroleum-derived fluxing agents.

It should also be pointed out that although the methyl esters of adipic, succinic and glutaric acid have already been recommended as cleaning agents for treating printed circuit boards according to patent U.S. Pat. No. 5,011,620, the teaching of said patent does not in any way make it possible to imagine using these same esters for the cleaning of substrates soiled specifically with bituminous compounds. This is all the more true since, according to these same teachings, the esters in question are not efficient for the cleaning of printed circuit boards unless they are mixed with extremely large amounts of hydrocarbon-based solvents, said solvents representing from 75% to 95% of these mixtures. In addition, since patent U.S. Pat. No. 5,011,620 concerns a field altogether different than the preparation of bituminous compositions, it is not at all possible to deduce therefrom any advantage of the abovementioned esters in this field and most particularly as fluxing agents.

Moreover, although the use of dianhydrohexitol derivatives (esters or ethers, but also polyesters, carbonates, thioethers, thioesters, amides, (thio)urethanes, urea, phosphates and phosphonates) as polymer solvents or plasticizers has been described in patent WO 99/45060, the teachings of said patent do not in any way make it possible to imagine using these same derivatives, including the esters or ethers, for the preparation or treating, especially the cleaning, of products consisting specifically of bituminous compositions.

The polymers envisioned both in the description and in the examples of said document and also the finished products containing them are neither identical nor similar to bituminous compositions such as bitumens, bituminous binders or Theological analogs thereof.

In addition, it is difficult to draw clear teachings from said document. The reason for this is that the application examples on pages 3 to 6 of said patent WO 99/45060, which therefore do not concern the field of bituminous compositions, do not specify which exact dianhydrohexitol derivative has been used as "plasticizer according to the invention". The exact effects of said derivative on the polymer are not always described or deducible, all the more so since, in many examples, said derivative is combined with an often-consequential amount of one or more solvents (toluene, isopropyl acetate/isopropanol, ethanol/iso-propyl acetate, "mineral spirit"/methanol).

The application examples 6 to 8 of said patent specify, for their part, the nature of the plasticizers used, namely esters of isosorbide or of isomannide. However, once again, these examples do not concern the field of preparing bituminous compositions but rather that of preparing PVC films (Examples 6-7) or vulcanized rubber (Example 8), i.e. solid finished products for which the best possible elasticity, drawability, suppleness or flexibility is desired. The function assured in this case by said esters is different than that mainly desired in accordance with the present invention, i.e. the function of a fluxing agent capable of ensuring a good rise in cohesion of the bituminous composition after its application.

In addition, the teachings of said patent do not in any way make it possible to imagine using these same esters for the cleaning of substrates specifically soiled with bituminous compositions.

As a result thereof, a novel means is now available that can be used in the abovementioned field of bituminous compositions, in particular as a fluxing agent or cleaning agent.

This means is formed by the compounds selected in accordance with the invention and which, in addition, have general characteristics that are categorically distinguished from those presented by the particular esters, of nonvolatile and highly oily nature, most particularly preferred or illustrated in the abovementioned patents U.S. Pat. Nos. 3,035,930 and 3 594 202.

Advantageously, the compounds used according to the invention especially have molecular weights and/or flash points that are significantly lower than those of said esters and especially:

a flash point of greater than 65° C. and less than 175° C., preferably greater than 90° C. and less than 170° C. and even more preferentially greater than 100° C. and less than 165° C. and/or a molecular weight of between 100 and 300, preferably between 130 and 300 and even more preferentially between 150 and 250.

In general, the compounds used according to the invention constitute a means that may especially be used for preparing or treating compositions chosen from the group comprising crude petroleum, fuel oils, tars, bitumens and bituminous binders, especially pure bitumens, road bitumens, industrial bitumens, oxidized bitumens, fluxed bitumens, fluidized bitumens, bitumens modified with polymers, in particular with elastomers and/or thermoplastic polymers, bitumens for anionic or cationic emulsions and anionic or cationic bitumens emulsions, Theological analogs of said bitumens and bituminous binders based on at least one resin of natural origin, which is optionally subsequently modified, coatings, in particular surface coatings, road mixes, in particular hot road mixes and storable road mixes, and bituminous paints.

These compositions may be intended in particular for (re)constructing, maintaining, repairing and/or cleaning traffic highways (roads, alleys, cycle tracks, airport runways, etc.), leakproofing screeds, sidewalk coverings, artwork coverings, building or dwelling coverings, thermal and sound insulations, leakproofing or covering materials for protecting against corrosion or against humidity, working, storage or transportation surfaces or enclosures, such as laboratory workbenches, tanks, pumps and cisterns, or contaminated materials, such as sand, rocks or live organisms.

These compositions may be advantageously used for preparing building and civil industry materials and in particular road construction materials.

These compositions may also advantageously be used for formulating or coating mineral-based materials (for example granulates or concrete surfaces or blocks) or wooden materials.

They may especially contain at least one product, taken alone or as a mixture, chosen from the group comprising bitumens, natural or synthetic elastomers, especially of polybutadiene type, natural latex, rubber, styrene-butadiene (SBR), styrene-butadiene-styrene (SBS) or ethylene copolymers, for instance ethylene/vinyl acetate (EVA) or ethylene/butyl acetate (EBA), thermoplastic polymers, especially of polyolefin, polyamide, polyester, polylactate, polyhydroxyalkanoate or polybutylsuccinate type, natural or modified natural resins, mineral, animal and vegetable oils and derivatives of said oils, surfactants, adhesives, Theological agents, crosslinking agents, for example for polymers, pigments, dyestuffs and granulates such as stones, gravel, broken gravel and/or sand.

A subject of the present invention is, inter alia, a process for preparing or treating a bituminous composition, characterized in that said composition is placed in contact with at least one compound chosen from the group consisting of:

glycolic, lactic and gluconic acid esters, and the methyl, ethyl and isobutyl esters of glutaric, succinic and adipic acids, and ethers or esters of a product derived from the internal dehydration of a sugar, preferably of a hydrogenated sugar.

Said compound may especially be chosen more particularly from one or the other of the families of compounds mentioned previously. It may also more particularly be chosen so as to have flash point and/or molecular weight characteristics that are within the ranges as described previously.

The bituminous composition may be intended for any of the abovementioned uses, for road or non-road constructions, and may contain, along with said compound, at least any one of the above-mentioned products (natural or synthetic elastomers, natural or modified natural resins, mineral, animal and vegetable oils and derivatives of said oils, surfactants, adhesives, Theological agents, crosslinking agents, pigments, dyestuffs and granulates, in particular).

The inventive concept of the present invention also covers a bituminous composition, characterized in that it contains, in any proportion and preferably in a proportion of from 0.1% to 95% by weight and more preferentially from 0.5% to 50% by weight, at least one compound chosen from the group consisting of:

glycolic, lactic and gluconic acid esters, and the methyl, ethyl and isobutyl esters of glutaric, succinic and adipic acids, and ethers or esters of a product derived from the internal dehydration of a sugar, preferably of a hydrogenated sugar.

Said compound may especially be chosen more particularly from one or the other of the families of compounds mentioned previously. It may also more particularly be chosen so as to have flash point and/or molecular weight characteristics that are within the ranges as described previously.

The bituminous composition may especially contain from 1% to 30% by weight of at least one of the abovementioned compounds. On account of the high efficacy of these compounds, and in a particularly advantageous manner, it contains only from 1% to 18% by weight thereof.

The compound used in said bituminous composition, especially in the proportions indicated above, may especially be dimethyl isosorbide (DMI).

The bituminous composition may be intended for any of the abovementioned uses, for road or non-road constructions, and may contain, along with said compound, at least one of any of the above-mentioned products (natural or synthetic elastomers, natural or modified natural resins, mineral, animal and vegetable oils and derivatives of said oils, surfactants, adhesives, Theological agents, crosslinking agents, pigments, dyestuffs and granulates, in particular).

A subject of the present invention is also the use, as a fluxing agent for a bituminous composition, of at least one compound chosen from the group consisting of:

glycolic, lactic and gluconic acid esters, and the methyl, ethyl and isobutyl esters of glutaric, succinic and adipic acids, and ethers or esters of a product derived from the internal dehydration of a sugar, preferably of a hydrogenated sugar.

This novel fluxing agent for bituminous compositions may most particularly be dimethyl isosorbide (DMI). This compound may especially be envisioned in combination, including in the form of preconstituted mixtures, with methyl esters of vegetable oils.

The Applicant company has especially found that DMI is miscible in all proportions with methyl esters of vegetable oils. As a result thereof, it is now possible to combine, especially in the form of preconstituted mixtures, DMI on the one hand and said methyl esters on the other hand, these mixtures truly being usable as fluxing agents.

A subject of the present invention is also the use, as an agent for cleaning a bituminous composition, of at least one compound chosen from the group consisting of:

glycolic, lactic and gluconic acid esters, and the methyl, ethyl and isobutyl esters of glutaric, succinic and adipic acids, and ethers or esters of a product derived from the internal dehydration of a sugar, preferably of a hydrogenated sugar.

This novel agent for cleaning bituminous composition is may especially be dimethyl isosorbide (DMI), alone or in combination, especially as a mixture, with other products, for instance terpenic compounds.

In general, the novel fluxing or cleaning agent for bituminous compositions according to the invention advantageously has:

a flash point of greater than 65° C. and less than 175° C., preferably greater than 90° C. and less than 170° C. and even more preferentially greater than 100° C. and less than 165° C. and/or a molecular weight of between 100 and 300, preferably between 130 and 300 and even more preferentially between 150 and 250.

The present invention will be described in even greater detail with the aid of the examples that follow, which are not in any way limiting.

EXAMPLE 1

This test examines the advantage, in particular as fluxing agents, of selected organic compounds according to the invention, in the field of preparing bituminous compositions.

A bitumen of "20/30" type provided by the company Eurovia is softened at a temperature of 100° C. in an oven. The softened bitumen is introduced into a Rheomix brand batch mixer, heated to 135° C.

Using this additive-free bitumen-based composition ("Bitumen T1"), the bituminous compositions below are prepared (Bitumens T2, T3 and T4 not in accordance with the invention and Bitumens A, B and C in accordance with the invention) by introducing 8 wt/wt % of bitumen of, respectively:

Bitumen T2: a commercial product of petrochemical origin, conventionally used as a bitumen-fluxing agent, having a very strong odor, a brown color, an aromatic nature, a flash point of between 60 and 65° C., a distillation temperature of about 190° C. and a density close to 0.97, Bitumen T3: a composition based on methyl esters of sunflower oil, with a characteristic odor of raw vegetable oil, a pale yellow color, a flash point of about 188° C., a distillation temperature close to 350° C. and a density of about 0.88, Bitumen T4: idem Bitumen T3 except that 0.15% (by weight/weight of bitumen) of manganese octanoate as siccative has also been introduced, Bitumen A: an odorless dimethyl isosorbide (DMI) composition prepared by the Applicant, Bitumen B: butyl lactate, of characteristic odor, sold by the company Sigma, Bitumen C: the relatively odorless "DBE® dibasic esters" composition based on dimethyl esters of glutaric, succinic and adipic acids, sold by the company Invista.

Each of the Bitumens T1 to T4 and A to C is blended for 30 minutes in the batch mixer and, after removing from said mixer, is then brought to ambient temperature.

A sample of each of said Bitumens is taken after reheating to 100° C., and the viscosity of the Bitumens is measured on an AR 2000 rheometer, in the course of a new cooling stage, when their temperature reaches 40° C. ("Visco 1" hereinbelow).

For each of the Bitumens T1 to T4 and A to C, the viscosity at 40° C. is measured again in the same manner, but after each of said Bitumens has been stored for 3 weeks at 50° C. in an open flask. This viscosity ("Visco 2" hereinbelow) thus measured makes it possible to assess the change in Theological behavior, in particular the "rise in cohesion", which should be that of the bitumen under consideration after its application under real conditions of aging in the road industry.

The table below collates, for the non-fluxed control bitumen (Bitumen T1), Bitumens T2 to T4 not in accordance with the invention and Bitumens A to C in accordance with the invention, the values of Visco 1 and Visco 2 thus found (expressed in mPa·s) and also the value of the variation factor of these viscosities equal to the ratio Visco 2/Visco 1 (referred to hereinbelow as the "V Index").

| Bitumen | Visco 1 (mPa · s) | Visco 2 (mPa · s) | V Index (Visco 2/Visco 1) |
| --- | --- | --- | --- |
| T1 | 79 400 | 110 000 | 1.4 |
| T2 | 9 500 | 33 300 | 3.5 |
| T3 | 3 200 | 5 700 | 1.8 |
| T4 | 4 400 | 6 200 | 1.4 |
| A | 10 700 | 31 400 | 2.9 |
| B | 9 700 | 19 000 | 2.0 |
| C | 5 400 | 37 700 | 7.0 |

These results show globally that:
1) the additive-free Bitumen T1 is not only extremely viscous (Visco 1 of 79 400 mPa·s), but also continues to increase in viscosity very significantly after aging (Visco 2=110 000 mPa·s),
2) the additives used in each of the Bitumens T2 to T4 and A to C are capable of very significantly reducing the initial viscosity of the bitumen, including that of the DMI, butyl lactate and DBE® dibasic ester compositions used in accordance with the present invention in, respectively, Bitumens A, B and C,
3) the prior art composition based on methyl esters of sunflower oil does indeed have a bitumen-fluidizing effect (cf. Bitumens T3 and T4). On the other hand, it does not make it possible, in the present case and including the case in combination with a siccative (Bitumen T4), to obtain a "rise in cohesion" of the same order as that obtained with the standard fluxing agent of petrochemical origin (cf. Bitumen T2 Visco 1=9500 mPa·s; Visco 2=33 300 mPa·s). This composition therefore cannot satisfy all the desired application objectives and especially for use in the construction of a heavy-traffic road,
4) the compounds that may be used in accordance with the present invention, firstly DMI (Bitumen A), but also the dibasic esters (Bitumen C) and, to a lesser extent, butyl lactate (Bitumen B), make it possible to obtain behavior, in particular a "rise in cohesion" that is (much) closer to that observed with said standard agent of petrochemical origin.

It is especially worthwhile emphasizing here the value of an isosorbide derivative such as DMI, which can thus, as a fluxing agent for a bitumen and/or resin composition, efficiently replace the adjuvants of the prior art, including those of fossil origin, and can do so while at the same time having particularly advantageous intrinsic characteristics and especially:
  a relatively high flash point, i.e. 120° C.,
  no odor or irritant effect to the skin and the eyes,
  an extremely low vapor pressure, i.e. $10^{-5}$ pascals at 20° C.,
  no negative impact on the environment, including the aquatic environment, and especially no bioaccumulation,
  high chemical stability,
  no corrosive power on metals,
  total solubility in water, in all proportions, which gives it good rinseability.

Separate tests performed by the Applicant showed that isosorbide esters or other lactic acid esters, in particular compositions based predominantly on isosorbide diesters, for instance isosorbide dioctanoate, or hexyl, butyl or dodecyl lactate, may also be used as bitumen-fluxing agents, in contrast with the methyl esters of vegetable oils, which produce excessively soft bitumens.

EXAMPLE 2

This example evaluates the advantage of compounds that may be used in accordance with the invention in the treatment of a bituminous composition and more particularly as solvents in the cleaning of a surface, in the present case a glass plate soiled with such a composition.

The bitumen, of "70/100" type provided by the company Eurovia, in molten form, is spread as a film about 0.5 to 1 mm thick onto the glass plate.

When the bitumen thus spread is at room temperature, pieces of cotton wool soaked with the test solvent compound are placed thereon. The cotton wool is covered with a glass dome to limit the evaporation of the solvent.

Each of the compounds is evaluated according to two tests, namely:
  Test 1: after 1 hour of contact between the bitumen and the soaked cotton wool, the cotton wool is removed to observe the action of the compound as a bitumen solvent.

The following notation is adopted for this Test 1:
  0: intact cotton wool,
  1: traces of bitumen on the cotton wool,
  2: cotton wool soiled on the entire surface,
  3: the bitumen has been dissolved by the solvent and has migrated into the cotton wool;
  Test 2: the cotton wool is then rubbed on the bitumen to evaluate the cleaning with mechanical action.

The following notation is adopted for this Test 2:
  0: intact cotton wool,
  1: traces of bitumen on the cotton wool,
  2: darkened cotton wool,
  3: clear attack of the bitumen,
  4: easy removal of the bitumen.

The various solvent compounds below were subjected to Test 1 and Test 2:
  Compound T1: gas oil of "red" type,
  Compound T2: D-limonene sold by the company Prodasynthe,
  Compound T3: sunflower oil methyl ester composition described in Example 1,
  Compound A: hexyl lactate synthesized by the Applicant,
  Compound B: mixture of 75% by weight of Compound A and 25% by weight of the Compound T3,
  Compound C: mixture of 50% by weight of Compound A and 50% by weight of Compound T2,
  Compound D: mixture of 75% by weight of Compound A and 25% by weight of Compound T2,
  Compound E: composition based on about 60% by weight (dry/dry) of a mixture of isosorbide dioctanoate and of sorbitan dioctanoate, obtained by the Applicant company from sorbitol and octanoic acid, said composition moreover containing, inter alia, isosorbide and sorbitan monooctanoates and sorbitan tri- and tetraoctanoates,
  Compound F: mixture containing 50% by weight of compound E and 50% by weight of Compound T2,
  Compound G: mixture of 65% by weight of Compound T1 and 35% by weight of dimethyl isosorbide (DMI) described in Example 1.

The table below collates, for each of the Compounds T1 to T3 and A to G, the note obtained for each of the tests Test 1 and Test 2:

| Compound | Test 1 | Test 2 |
| --- | --- | --- |
| T1 | 1 | 4 |
| T2 | 2 | 4 |
| T3 | 2 | 3 |
| A | 2 | 3 |
| B | 2 | 3 |
| C | 2 | 4 |
| D | 2 | 3 |
| E | 1 | 2 |
| F | 2 | 3 |
| G | 1 | 4 |

This table shows globally that compounds that may be used in accordance with the invention may be used as solvents, including as cosolvents, for treating bituminous compositions, in particular for cleaning surfaces or materials contaminated or soiled with such compositions.

This is the case, for example, for hexyl lactate, which can advantageously totally or partially replace products such as gas oil, D-limonene or methyl esters of vegetable oils.

This is also the case for isosorbide esters or ethers, for instance isosorbide dioctanoate and dimethyl isosorbide (DMI).

In particular, the observation made herein of the functionality of DMI as a bitumen solvent, combined with the numerous properties of this compound as pointed out in Example 1, makes it possible to envision using this product for industrial cleaning or decontaminating of enclosures (for example tanks), of surfaces (for example laboratory workbenches) or of materials (sand or rocks), including its use as an at least partial replacement for a compound of fossil origin such as gas oil.

EXAMPLE 3

In this test, a study was made of the advantage of isosorbide dioctanoate as a fluxing agent for a bituminous composition consisting of a Theological analog of bitumen and comprising, on a weight basis:
- 78% of the composition "Dertoline P2L" based on pentaerythritol esters of rosin, sold by the company DRT,
- 4% of polymers of 20/20 EVA type, sold by the company Arkema, and
- 18% of isosorbide dioctanoate prepared by the Applicant.

For this bituminous composition in accordance with the present invention, the following characteristics were measured:
- the ring-and-ball temperature according to standard NF EN 1427,
- the penetration, in particular at 25° C., according to standard NF EN 1426, and
- the penetration index.

This was compared with the control compositions "T1" and "T2" below:
- T1: road bitumen of "50/70" type provided by the company Eurovia,
- T2: the bituminous composition based on 85% of Dertoline P2L esters, 4% of 20/20 EVA polymers and 11% of sunflower oil methyl esters as used in Example 1 above for Bitumens 3 and 4.

It is found that the bituminous composition in accordance with the invention has:
- a ring-and-ball temperature of 55.8° C., which is higher than that obtained for control compositions T1 (50° C.) and T2 (55.4° C.),
- a penetration value at 25° C., expressed in tenths of a millimeter, of 59, which is higher than that obtained for the control compositions T1 (52) and T2 (47),
- an LCPC penetration index in the region of 0 (−0.03), whereas it is about −1 for the compositions T1 (−0.91) and T2 (−0.96).

It results therefrom that, globally, the rheological properties of the composition in accordance with the invention are more advantageous than those of the control compositions. This is especially due to its lower susceptibility to temperature variations, which makes it possible to envision wider fields of application.

The invention claimed is:

1. A method for preparing or treating a bituminous composition, comprising contacting said composition with 1-18% by weight of at least one compound selected from the group consisting of ethers or esters of an internal dehydration product of sorbitol, mannitol, or iditol, at least 50% by weight (dry/dry) of said at least one compound being a diester or diether of isosorbide, of sorbitan, of isomannide, or of isoidide, or a mixture thereof.

2. The method according to claim 1, wherein said compound is selected from the group consisting of ethyl, methyl, acetyl, butyl, isobutyl, hexyl, 2-ethylhexyl, octenyl, lauryl, palmityl, stearyl or oleyl derivatives of isosorbide, of sorbitan, of isomannide and of isoidide, and mixtures thereof.

3. The method according to claim 1, wherein at least 50% by weight (dry/dry) of said compound is dimethyl isosorbide.

4. The method according to claim 1, wherein at least 80% by weight (dry/dry) of said compound is dimethyl isosorbide.

5. The method according to claim 4, wherein said compound has a flash point of greater than 65° C. and less than 175° C.

6. The method according to claim 4, wherein said compound has a flash point of greater than 90° C. and less than 170° C.

7. The method according to claim 4, wherein said compound has a flash point of greater than 100° C. and less than 165° C.

8. The method according to claim 1, wherein said compound has a molecular weight of between 100 and 300.

9. The method according to claim 1, wherein said compound has a molecular weight of between 130 and 300.

10. The method according to claim 1, wherein said compound has a molecular weight of between 150 and 250.

11. The method according to claim 1, wherein said bituminous composition is selected from the group consisting of crude petroleum, bitumen and bituminous binders, coatings, road mixes, and bituminous paints.

12. The method according to claim 1, wherein said bituminous composition is a composition for constructing, reconstructing, maintaining, repairing or cleaning traffic highways, leakproofing screeds, sidewalk coverings, artwork coverings, building or dwelling coverings, thermal and sound insulations, leakproofing or covering materials for protecting against corrosion or against humidity, working, storage or transportation surfaces or enclosures, or contaminated materials.

13. The method according to claim 1, wherein said bituminous composition contains at least one product selected from the group consisting of bitumens, natural and synthetic elastomers, thermoplastic polymers, natural and modified natural resins, mineral, animal and vegetable oils and derivatives of said oils, surfactants, adhesives, rheological agents, crosslinking agents, pigments, dyestuffs and granulates.

14. A bituminous composition comprising from 1% to 18% by weight of at least one compound selected from the group consisting of ethers or esters of a product derived from the internal dehydration of sorbitol, mannitol, or iditol, at least 50% by weight (dry/dry) of said compound being a diester or diether of isosorbide, of sorbitan, of isomannide, or of isoidide, or a mixture thereof.

15. The bituminous composition according to claim 14, wherein said at least one compounds is used as fluxing agent.

16. The bituminous composition according to claim 14, wherein said at least one compound is dimethyl isosorbide.

17. The bituminous composition according to claim 14, wherein dimethyl isosorbide is used in combination with methyl esters of vegetable oils.

18. The bituminous composition according to claim 14, wherein said at least one compound has a flash point of greater than 65° C. and less than 175° C.

19. The bituminous composition according to claim 14, wherein said at least one compound has a molecular weight of between 100 and 300.

* * * * *